(12) United States Patent
Aranzulla et al.

(10) Patent No.: US 7,396,045 B2
(45) Date of Patent: Jul. 8, 2008

(54) GAS BAG

(75) Inventors: Daniele Aranzulla, Schwaebisch Gmuend (DE); Juergen Schmid, Durlangen (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 11/701,951

(22) Filed: Feb. 2, 2007

(65) Prior Publication Data
US 2007/0182144 A1 Aug. 9, 2007

(30) Foreign Application Priority Data
Feb. 8, 2006 (DE) .................. 10 2006 005 793

(51) Int. Cl.
*B60R 21/20* (2006.01)
(52) U.S. Cl. .................................... 280/743.2
(58) Field of Classification Search ............ 280/743.1, 280/743.2, 732
See application file for complete search history.

(56) References Cited

U.S. PATENT DOCUMENTS 6,315,323 B1    11/2001  Pack, Jr.
6,334,627 B1    1/2002   Heym et al.
2005/0023811 A1 2/2005   Thomas
2006/0249943 A1* 11/2006 Bauer et al. ............... 280/743.2

FOREIGN PATENT DOCUMENTS

JP   03067748 A  *  3/1991
JP   07069149        3/1995
JP   08301030 A  *  11/1996

* cited by examiner

Primary Examiner—Faye M. Fleming
(74) Attorney, Agent, or Firm—Tarolli, Sundheim, Covell & Tummino LLP

(57) ABSTRACT

A gas bag (10) for a vehicle occupant restraint system includes a limiting strap (12) which is guided along a wall (14) of the gas bag (10), the limiting strap (12) being shortened in an initial state by at least one gathered section such that the gas bag (10) is constricted and is not able to deploy freely, the at least one gathered section being extendable after a predetermined limiting strap tensile force is exceeded, so that the gas bag (10) may be deployed completely.

7 Claims, 3 Drawing Sheets

GAS BAG

TECHNICAL FIELD

The invention relates to a gas bag for a vehicle occupant restraint system.

BACKGROUND OF THE INVENTION

In the production of gas bags for vehicle occupant restraint systems particular attention is paid to the improvement of the restraint values of a vehicle occupant, e.g. by the configuration of a gas bag contact surface for the impacting occupant as large as possible. Besides, the gas bag is also intended to react individually adapted to special circumstances, such as a non-optimum restraint position of the occupant, an existing child safety seat, a safety belt not fastened by the occupant, etc. as far as possible. In doing so, the gas bag design should, however, not become too complex, in order to ensure a reliable and well reproducible unfolding characteristic and keep the manufacturing expense low.

BRIEF SUMMARY OF THE INVENTION

The invention provides a gas bag for a vehicle occupant restraint system, including a limiting strap which is guided along a wall of the gas bag, the limiting strap being shortened in the initial state by at least one gathered section such that the gas bag is constricted and is not able to deploy freely, the at least one gathered section being extendable after a predetermined limiting strap tensile force is exceeded, so that the gas bag may be deployed completely. This offers the advantage that after an activation of the vehicle occupant restraint system a constricted contour is initially forced upon the gas bag. At first, this constricted contour prevents the gas bag from deploying completely towards the occupant, so that the high velocity impulse of the gas bag is taken up by the limiting strap gathered in sections and not by the occupant himself. In particular, the gas bag according to the invention offers advantages in those cases in which the gas bag is configured as a front passenger airbag and the occupant is an infant in a child safety seat. Especially in the case of rearwardly directed child safety seats and low car seats for infants the gas bag does not directly hit the child safety seat or the head of the child with its high impulse after activation of the vehicle occupant restraint system, but is at first slowed down by the gathered limiting strap and assumes a constricted contour. At first, the gas bag develops its maximum height and width in this constricted contour, before the gathered limiting strap sections are increased in length after a gas bag internal pressure or a limiting strap tensile force which may be predetermined are exceeded, so that the gas bag may assume its full depth. In the present specification the term gas bag depth refers to an extension directed from the gas bag module towards the occupant in the installed state of the gas bag and the terms gas bag height and -width refer to extensions perpendicular thereto.

Preferably, a releasable holding element is provided, which in an initial state holds the gathered section of the limiting strap in a gathered state and permits an extension of the gathered section when the predetermined limiting strap tensile force is exceeded. Such a holding element offers a particularly simple possibility to hold the limiting strap sectionwise in its gathered state and to permit a release of the gathering and thus an effective extension of the limiting strap only when the possibly predetermined limiting strap tensile force is exceeded. Inexpensive holding elements by means of which a predetermined limiting strap tensile force may easily be adjusted are for example tear seam tucks or metal clips.

In one embodiment the limiting strap includes a plurality of gathered sections which are held in the gathered state by one releasable holding element each, the holding elements being configured such that they permit an extension of their associated gathered limiting strap sections offset in time at different limiting strap tensile forces. By means of this measure the gas bag assumes several constricted contours, so that the gas bag depth stepwise increases up to the complete deployment of the gas bag.

In order to guide the limiting strap, lugs may be provided on the gas bag wall of the gas bag. These lugs represent a very simple and inexpensive possibility to guide the limiting strap along the wall of the gas bag. The lugs are preferably made of the same material as the gas bag wall, e.g. of a fabric.

In a further embodiment the limiting strap is substantially situated in a vertical plane in the unfolded state of the gas bag. The gas bag is constricted in the region along the limiting strap. A vertical arrangement of the limiting strap offers the advantage that the occupant is protected irrespective of his or her size and regardless of an existing low car seat for infants or a rearwardly directed child safety seat having a high back rest. By means of the vertical limiting strap arrangement a protection of an occupant is ensured over the entire gas bag height.

In a further embodiment the gas bag wall includes in the unfolded state a front wall section which faces a vehicle seat when the gas bag is installed, and a rear wall section which faces away from the vehicle seat when the gas bag is installed, the limiting strap extending from the rear wall section across the front wall section and back again up to the rear wall section. This limiting strap profile is excellently suited to prevent the gas bag from deploying freely in its initial state, i.e. in the partially deployed, sectionwise constricted state, in such a manner that mainly the development of the gas bag depth is restricted.

The invention further relates to a gas bag module for a vehicle occupant restraint system, including a module housing and a gas bag in accordance with the invention, the limiting strap being guided on the gas bag wall between a first limiting strap end and a second limiting strap end, and the limiting strap ends each being attached to the module housing or the gas bag wall. In order to ensure the desired unfolding characteristic of the gas bag, the limiting strap ends must be secured reliably. In particular, such a reliable attachment is advantageously possible on the rigid module housing of the gas bag module or also on the gas bag wall, the attachment on the gas bag wall being preferably realized by a seam.

DETAILED DESCRIPTION OF THE PREFERRED EMBODIMENTS

Figure 1:
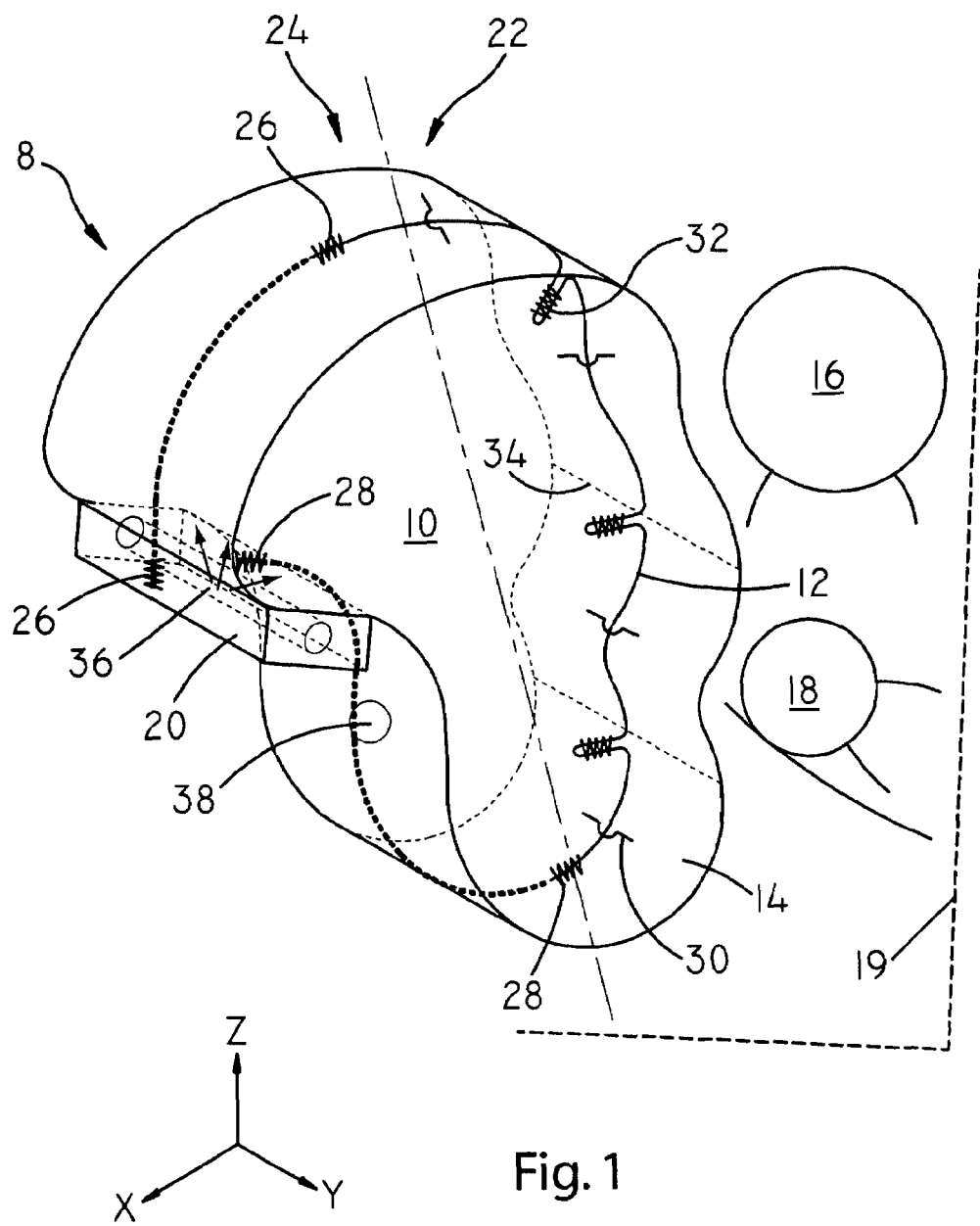
FIG. 1 shows a perspective view of a gas bag module according to the invention including a gas bag according to the invention in an initial state.

FIG. 1 shows a gas bag module 8 of a vehicle occupant restraint system in a schematic, perspective view. The vehicle occupant restraint system has already been activated, so that a gas bag 10 is already partially deployed. In the initial state represented, the gas bag 10 is prevented from a free and complete deployment by a limiting strap 12. FIG. 1 and all further figures represent a gas bag wall 14 in a transparent fashion, in order to be able to see the inner limiting strap 12.

Moreover, the possible position of an occupant is schematically indicated in FIG. 1. Representing the occupant, a head 16 of an adult and a child's head 18 are illustrated, the child being in a rearwardly directed child safety seat or an car seat for infants. The child safety seat or the car seat for infants are positioned on a vehicle seat 19 which is also shown schematically.

For the further description of the gas bag 10 terms are now defined for the directions of expansion of the gas bag 10. The deployment of the gas bag 10 from a module housing 20 towards the occupant (negative x-direction) is hereinafter referred to as the gas bag depth. The extension of the gas bag 10 in the z-direction is referred to as the gas bag height and the extension in the y-direction is referred to as the gas bag width. A wall section of the gas bag 10 which faces the occupant or the vehicle seat 19 is referred to as a front wall section 22, and a wall section facing away from the occupant or the vehicle seat 19 is referred to as a rear wall section 24. In FIG. 1, the dot-dash line roughly indicates the transition region of the wall sections 22, 24 of the gas bag wall 14. With regard to the gas bag width (y-direction) the limiting strap 12 is disposed approximately in the center and extends in a substantially vertical (xz-) plane. A first limiting strap end 26 and a second limiting strap end 28 of the limiting strap 12 are secured to the gas bag wall 14. More precisely, in the present example the limiting strap ends 26, 28 are sewn to the rear wall section 24. As an alternative, the limiting strap 12 may also be continued up to the module housing 20 of the gas bag module 8, so that the limiting strap ends 26, 28 may be secured to the module housing 20. To guide the limiting strap 12 along the gas bag wall 14 lugs 30 are provided, these lugs being preferably made of the same material as the gas bag wall 14. The lugs 30 are secured to the gas bag wall 14, e.g. by sewing.

In the initial state the effective length, i.e. the distance between the first limiting strap end 26 and the second limiting strap end 28 is shortened, since several sections of the limiting strap 12 are gathered. For gathering a limiting strap section, one releasable holding element 32 is provided respectively, which in the initial state holds the respective gathered section of the limiting strap 12 in a gathered state and, when a possibly predetermined limiting strap tensile force is exceeded, permits an extension of the gathered section. According to FIG. 1, the releasable holding elements 32 are tear seam tucks which tear up when the predetermined limiting strap tensile force is exceeded and release the gathered sections. As an alternative, metal or plastic clips may also be used as holding elements 32, these metal or plastic clips breaking, snapping open, or being bent open at the predetermined limiting strap tensile force, so that they likewise permit an extension of the gathered section.

FIG. 1 illustrates a state of the gas bag 10 constricted by the limiting strap 12 gathered in sections, in which a complete development of the gas bag depth is impeded. The high velocity impulse of the front wall section 22 towards the occupant after an activation of the vehicle occupant restraint system is consequently taken up at first by the limiting strap 12.

Figure 2:
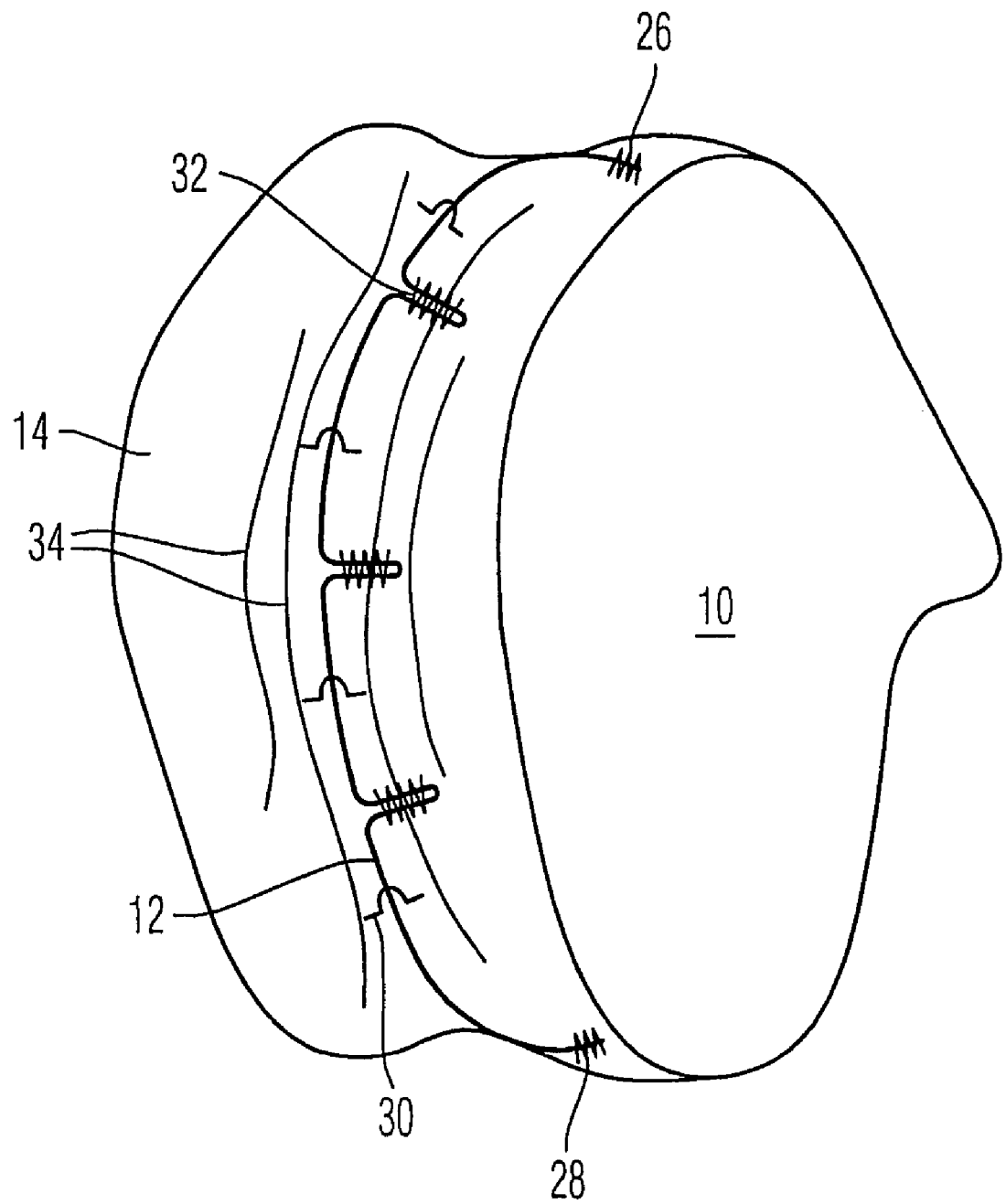
FIG. 2 shows a perspective view of a further gas bag according to the invention in the initial state.

In the illustration according to FIG. 1, the constriction of the gas bag 10 seems to result in a development of folds, the folds substantially extending in the y-direction. FIG. 2 shows a perspective view of a further gas bag 10 in which the folds 34 mainly extend in the z-direction owing to the gas bag constriction. In reality, the constriction of the gas bag will result in folds both in the y-direction and in the z-direction.

After forming the constricted inner contour of the gas bag 10, the gas bag internal pressure further increases owing to a continued emission of gas by a gas generator 36. In the constricted region of the gas bag wall 14 folds 34 are formed, from which may be concluded that in this region the gas bag wall 14 does not experience any peripheral stresses owing to the gas bag internal stress. In this constricted region the stresses are taken up as a tensile force in the limiting strap 12. The tear seam tucks, which in the present case serve as the releasable holding elements 32, burst at a limiting strap tensile force that may be predetermined, so that the gathering in the gathered sections of the limiting strap 12 dissolves and the effective length of the limiting strap 12 increases.

Should several releasable holding elements 32 be provided, as shown in FIGS. 1 and 2, these releasable holding elements may be configured such that all of them permit an extension of the gathered section associated therewith at the same limiting strap tensile force. After an activation of the vehicle occupant restraint system, the gas bag 10 then assumes at first its constricted, restraint contour and may deploy completely upon the extension of the limiting strap.

As an alternative, the holding elements 32 may be configured such that they permit an extension of their associated gathered limiting strap sections at different limiting strap tensile forces, i.e. offset in time. This means that after formation of a first constricted contour up to its complete deployment, the gas bag 10 temporarily assumes further constricted contours in which at least one of the releasable holding elements 32 has already been released and the remaining releasable holding elements 32 continue to hold their associated limiting strap sections in a gathered state. Thus, the contours of the deploying gas bag 10 may stepwise be defined up to its complete deployment.

Figure 3:
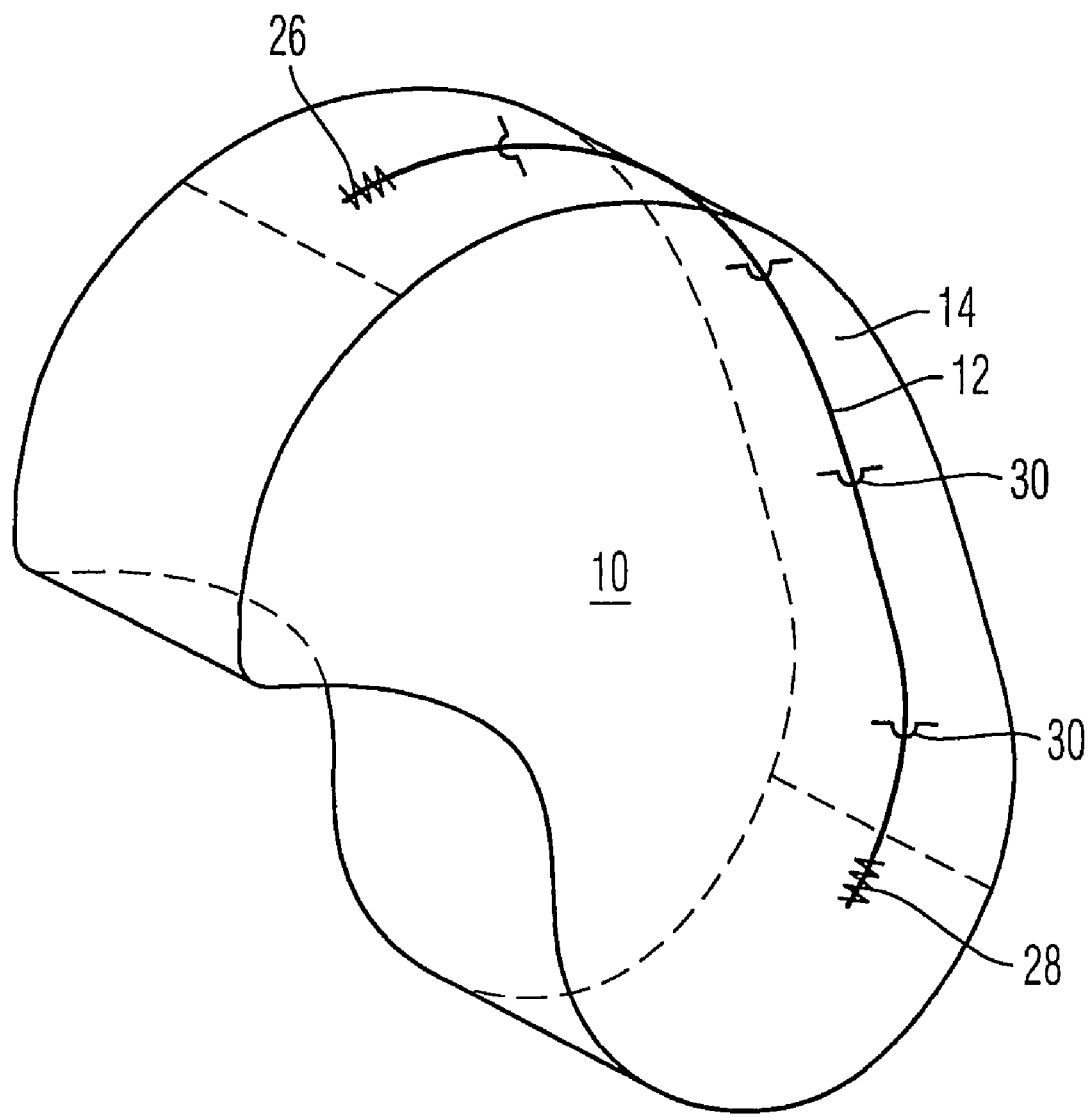
FIG. 3 shows a perspective view of a gas bag according to the invention in a completely unfolded state.

FIG. 3 shows a perspective view of the gas bag 10 of FIG. 1, the holding elements 32 having become loose of their associated gathered limiting strap sections and not holding the limiting strap sections in the gathered state any longer. Accordingly, the gathered sections of the limiting strap 12 have increased in length, so that the limiting strap 12 does not constrict the gas bag 10 any longer, and the gas bag 10 is completely deployed.

Of course, the gas bag 10 may also have an outflow opening 38 (cf. FIG. 1) provided therein which, as is known from the prior art, has a positive effect on the occupant restraint, in particular on the damping of the occupant upon immersing into the gas bag. In this arrangement the outflow opening 38 and a possible control of the outflow cross section of the outflow opening 38 are, however, completely independent of the limiting strap 12.

The invention claimed is:

1. A gas bag (10) for a vehicle occupant restraint system, including a limiting strap (12) which is guided along a wall (14) of said gas bag (10), said limiting strap (12) being shortened in an initial state by at least one gathered section such that said gas bag (10) is constricted and is not able to deploy freely, said at least one gathered section being extendable after a predetermined limiting strap tensile force is exceeded, so that said gas bag (10) may be deployed completely, said limiting strap (12) has a plurality of gathered sections being held in said gathered state by one releasable holding element (32) each, said holding elements (32) being configured such that they permit an extension of their associated gathered limiting strap sections offset in time at different limiting strap tensile forces.

2. The gas bag (10) according to claim 1, wherein a releasable holding element (32) is provided, said releasable holding element (32) holding in said initial state said gathered section of said limiting strap (12) in a gathered state and permitting an extension of said gathered section when said predetermined limiting strap tensile force is exceeded.

3. The gas bag (10) according to claim 1, wherein lugs (30) are provided on said gas bag wall (14) for guiding said limiting strap (12).

4. The gas bag (10) according to claim 1, wherein in an unfolded state of said gas bag (10) said limiting strap (12) is substantially situated in a vertical plane.

5. The gas bag (10) according to claim 1, wherein in an unfolded state said gas bag wall (14) comprises a front wall section (22) which faces a vehicle seat (19) when said gas bag (10) is installed, and a rear wall section (24) which faces away from the vehicle seat (19) when said gas bag (10) is installed, said limiting strap (12) extending from said rear wall section (24) across said front wall section (22) and back again up to said rear wall section (24).

6. A gas bag module (8) for a vehicle occupant restraint system, including a module housing (20) and a gas bag (10) according to claim 1, wherein said limiting strap (12) is guided on said gas bag wall (14) between a first limiting strap end (26) and a second limiting strap end (28), said limiting strap ends (26, 28) each being secured to one of said module housing (20) and said gas bag wall (14).

7. A gas bag (10) for a vehicle occupant restraint system, including a limiting strap (12) which is guided along a wall (14) of said gas bag (10), said limiting strap (12) being shortened in an initial state by at least one gathered section such that said gas bag (10) is constricted and is not able to deploy freely, said at least one gathered section being extendable after a predetermined limiting strap tensile force is exceeded, so that said gas bag (10) may be deployed completely, wherein in an unfolded state said gas bag wall (14) comprises a front wall section (22) which faces a vehicle seat (19) when said gas bag (10) is installed, and a rear wall section (24) which faces away from the vehicle seat (19) when said gas bag (10) is installed, said limiting strap (12) extending from said rear wall section (24) across said front wall section (22) and back again up to said rear wall section (24).

\* \* \* \* \*